United States Patent [19]

Kreiensen et al.

[11] 3,731,386
[45] May 8, 1973

[54] MEASURING DEVICE FOR DETERMINING THE ANGULAR POSITION OF A CAM

[76] Inventors: Kurt Kreiensen, Konigsberger Str. 5a, Villingen; Karl Hutter, Lerchenweg 195, Muhlhausen, both of Germany

[22] Filed: Oct. 23, 1970

[21] Appl. No.: 83,405

[52] U.S. Cl. .............. 33/1 PT, 33/172 E, 33/174 L
[51] Int. Cl. ............................................. G01b 5/24
[58] Field of Search .............. 33/1 O, 1 N, 1 DT, 33/172 E, 174 L, 174 Q, 174 R

[56] References Cited

UNITED STATES PATENTS

| 3,245,148 | 4/1966 | Whitney | 33/174 L |
| 3,222,791 | 12/1965 | Huntley et al. | 33/174 L |
| 3,604,248 | 9/1971 | Altmann | 33/174 L |
| 3,426,437 | 2/1969 | Rebhun et al. | 33/174 Q |

Primary Examiner—William D. Martin, Jr.
Attorney—Molinare, Allegretti, Newitt & Witcoff

[57] ABSTRACT

The invention relates to a measuring device for determining the angular position or orientation of a cam, with an electrical length measuring follower, the pin of which bears radially on the rotary cam and produces a measurement voltage representative of the radial measurement of the cam at any given moment.

9 Claims, 6 Drawing Figures

INVENTORS
KURT KREIENSEN
& KARL HUTTER
BY
ATTORNEYS

MEASURING DEVICE FOR DETERMINING THE ANGULAR POSITION OF A CAM

BACKGROUND OF THE INVENTION

One known method of determining the angular position of a cam is to turn the cam about its axis of rotation and to measure the radial value of the cam corresponding to various angular positions by means of an electrical length measuring follower, the pin of which is directed towards the axis of rotation and rests on the face of the cam. The measurement and evaluation are then carried out by hand. The measurement values are tabulated or plotted as coordinates. The displacement of the cam curve so obtained and plotted enables the cam alignment to be determined. At the same time, as a rule, comparison is made with a desired-value curve.

This existing method is very time-consuming and expensive, since a great many measurements have to be made and plotted by one person and because, more especially, the mean angular position must then be determined by eye from the actual-value curve. This determination by eye may result in errors due to the subjective judgment of the observer. Even when the maximum time and the utmost care are devoted to the matter, however, two considerable types of errors are unavoidable. Since, as a rule, the cam is on a shaft held in bearings situated axially away from the cam, errors arise from the inevitable "give" in the camshaft. This type of error is particularly marked when the bearings are necessarily remote from the cam, as is often the case with the camshafts of multi-cylinder internal combustion engines.

The other drawback is that the radius of curvature of the pin of the length measuring follower has a finite value and because of the oblique contact of the pin with the cam face, the point of contact wanders in relation both to the cam face and to the rounded end of the pin, giving rise to considerable errors in measurement. Although these errors can partly be eliminated by comparison with a "control" cam, this can only be done by expending considerable effort.

What the invention sets out to do is to provide measuring device for determining the angular position of the cam, with which the angular position can be determined directly, without any intermediate evaluation, and errors due to camshaft "give" and to finite radius of curvature of the measuring pin can be eliminated.

SUMMARY OF THE INVENTION

Accordingly the present invention provides a measuring device for determining the angular position or orientation of the cam, comprising means for rotatably mounting a cam, first and second electrical length measuring followers, said first follower being arranged to bear radially at a first point on the cam carried in said mounting means and said second follower being arranged to bear radially at a second point angularly displaced from said first point, on said cam whereby first and second measurement voltages are respectively produced by said followers representative of the instantaneous radial measurement of said cam at said first and second points, and a differential circuit including an indicating means, said followers being connected to said differential circuit whereby said indicating means may indicate the difference voltage between said first and second measurement voltages.

Because the invention employs two measuring followers in different angular positions, it is possible for the angular position of the cam to be directly read or adjusted. Should the radial values measured at both followers be the same, for a cam of normal type, the alignment of the cam will lie precisely midway between these two angular positions of the followers. In the case of an unsymmetrical cam, it is readily possible, with the aid of the prescribed "control" curve, to determine that angular position of the two electrical length measuring followers at which the two radial values to be measured are equal and to indicate, by reference to the cam set up for equal amplitudes of excursion, that is to say for zero differential voltage, the angular alignment of the cam. "Angular alignment" means here, in general, the angle of maximum cam radius.

With the measuring device here proposed, a balancing or bridge measurement is made in practice, in which errors due to camshaft give and to the unavoidable finite radius of curvature of the tip of the measuring pin are offset and thus eliminated. If, for instance, the setting of the measuring device is such that the indicating instrument gives a zero reading, that means that both the measuring pins are lying at one and the same radius, but in different angular positions. The resultant contact pressures of the pins then lie symmetrically about the cam alignment, and any give in the camshaft arising from the resultant contact pressures causes the excursions or deviations of the pins to be equal in value and direction. Since the voltages from both followers are connected in a differentiating circuit, the two additional voltages are offset by the give in the camshaft. It is also easily possible, by positioning the length measuring followers symmetrically about the direction of gravity, to provide compensation for the give of long camshafts under their own weight.

In addition to this, the tips of the measuring pins, in the measuring device here proposed, lie with their curvatures of finite radius in contact with faces of opposite slope on the cam. Hence, errors arising from this finite radius of curvature are equal in value and effect for both followers. Since the measurement voltages are differentially connected, such errors cancel each other out.

All together, then, the result is a measuring device of simple design, which is easy to operate, makes rapid measurement possible and provides compensation for the main sources of error.

BRIEF DESCRIPTION OF THE DRAWINGS

The invention will now be described in greater detail in conjunction with the accompanying drawings, in which.

DETAILED DESCRIPTION OF THE PREFERRED EMBODIMENT

Figure 1:
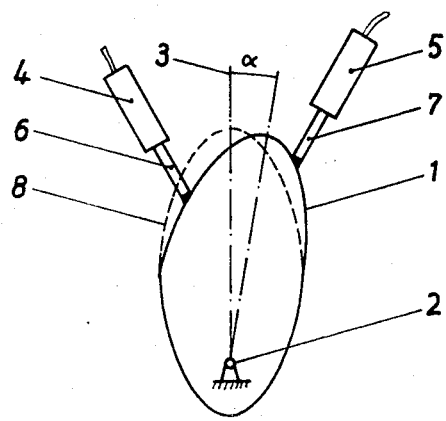
FIG. 1 shows one simple form of the invention employing two length measuring followers.

In FIG. 1, a cam 1, is mounted to rotate in a stationery bearing, 2. Fitted symmetrically about the desired angular position represented by the chain line 3 are two electrical length measuring followers, 4 and 5, the pins 6 and 7 of which are directed radially at the turning center of the bearing 2. The broken line 8 represents the cam 1 when in the desired angular position indicated by the chain line 3.

Figure 2:
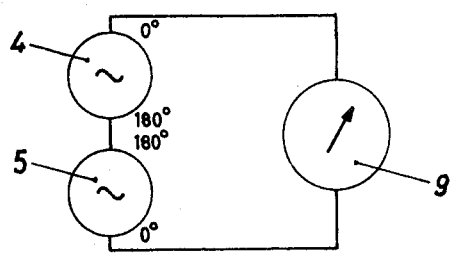
FIG. 2 shows the circuit layout for the device illustrated in FIG. 1.

FIG. 2 shows the appropriate circuit layout for the measuring device illustrated in FIG. 1. For the sake of simplicity, the two followers 4 and 5 are represented diagrammatically as alternators, since these followers normally send out a.c. voltages proportional to the excursions of their pins. The followers 4 and 5 are joined in series but in opposition to each other, as is indicated by the phase-angle figures 0–180° and 180°–0°. The voltages from the two followers 4 and 5 are thus subtracted one from the other, only the differential voltage being shown accordingly on an indicating instrument 9 inserted in the circuit. The zero point of the instrument 9 should preferably lie in the middle of the scale.

For measurement, the cam 1 is turned until the indicating instrument 9 shows zero differential voltage. At that moment, the cam 1 is in the position shown by the chain line 3 and thus occupies the prescribed reference position. This reference position can then be marked in relation to a camshaft or to some other scale. It is now also possible, for example, to effect adjustment in relation to another cam, the position of which has been determined in the same way.

In its simplest form, the indicating instrument merely shows the zero value of differential voltage, the zero point on the scale being in the middle. It is also possible, of course, to introduce the cam into the measuring device in a particular position and to graduate the scale of the indicating instrument in degrees of angle by which the desired and actual positions differ from each other.

Particularly in the case of small deviations in the angular position of the cam, the deflection of the indicating instrument 9 for a particular known cam shape can be directly calibrated in degrees of angle, so that it is no longer essential for the cam to be rotated; instead, any deviation in the angular position of the cam can be read directly from the scale.

Figure 3:
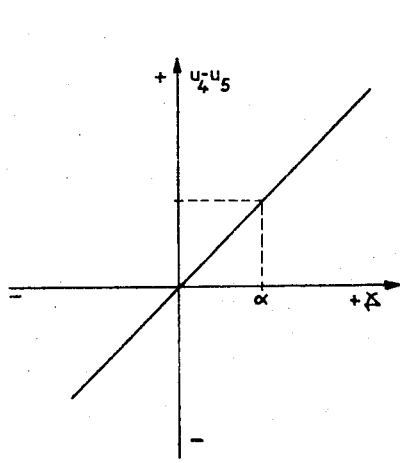
FIG. 3 is a graph showing the variation in differential voltage with the angular position of the cam.

FIG. 3 is a diagrammatic representation of how the differential voltage $u_4-u_5$ and hence the deflection of the indicating instrument 9 varies with the angular position of the cam. As shown in this diagram, for an angle difference of such as also appears in FIG. 1, there is a differential voltage of a particular value. Accordingly, when the pointer of the instrument 9 is deflected, the angle can be read directly off the scale.

The basic testing gauge provided by the invention can be further improved upon in many ways. In particular, there is advantage in providing two groups of length measuring followers adjacent, that is to say in replacing each of the length measuring followers already mentioned by a group of such followers. The followers in each group should be interconnected by a summation circuit, while the two groups themselves should be interconnected by a differentiating circuit. By such multiple reference to cam radii at different points, curve inaccuracies can also be included in the measurement. In that way, it becomes a very simple matter to derive a mean value from the various radius errors and thus to determine with the utmost possible precision the angular alignment of the cam related to the cam shape. For cams of unsymmetrical shape, the individual length measuring followers can be adjusted according to the cam "control" curve, in addition to which it is possible and in many cases desirable to apply weighting to the measurement voltages of the individual followers, so that the various measurement voltages affect the measurement result to differing degrees. For adjustable weighting, the voltages of the individual followers may be separately tapped off voltage dividers.

Figure 4:
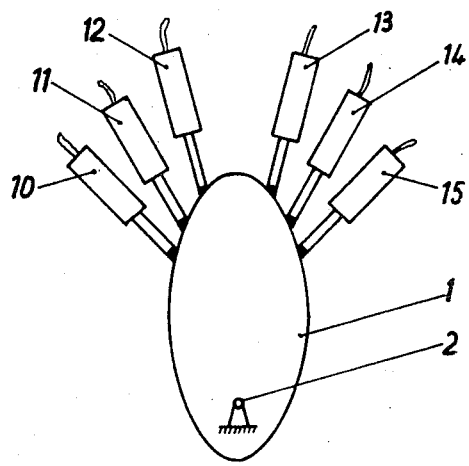
FIG. 4 shows another form of measuring device conforming to the invention, with two groups of three followers.

FIG. 4 shows another practical example of the invention, in which a cam, 1, is again mounted in a stationary bearing, 2. In this example, however, two groups of length measuring followers are provided, namely 10, 11 and 12 and 13, 14 and 15, all of which have their pins resting on the face of the cam 1, so as to measure the cam radii at a number of points and to provide corresponding initial voltage signals.

Figure 5:
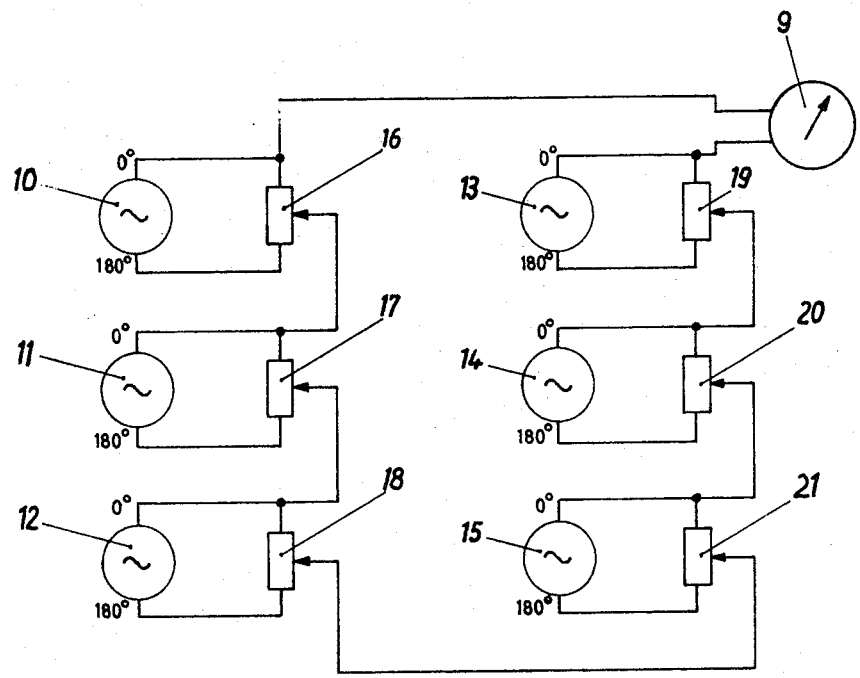
FIG. 5 shows the circuit layout for the device illustrated in FIG. 4.

As can be seen from FIG. 5, the followers 10, 11 and 12 in the one group are joined in the same direction or phase in series, as are also the followers 13, 14 and 15 in the other group. The phase positions of the followers (shown in the circuit layout as alternators) are clearly indicated by the corresponding phase-angle figures. To ensure that the measurement voltages of the individual followers affect the measurement result to different degrees, according to the slope at each of the reading points, the voltages of the followers are tapped off in each case from voltage dividers, 16, 17 and 18 and 19, 20 and 21. The two groups as such are joined in series and in counterphase, so that on the indicating instrument 9 the differential voltage is again shown in precisely the same way as in the example given in FIG. 1, but this time with weighting applied through the individual follower voltages. The measurement process need not be explained in detail here, since it largely corresponds to that of the device shown in FIG. 1.

The device with which the invention is concerned provides a very simple method of fully automatic measurement. All this requires is for the evaluating instrument to incorporate a change-over switch with a central position of rest, which the switch takes up when the differential voltage is zero, the switch moving to one operative position for positive differential voltage and to the other operative position for a negative differential voltage. This switch controls a motor and, according to its position, causes the motor to run in one direction or the other, so that it rotates, along with the cam that is to be measured and which is coupled to the motor, in a direction such that the differential voltage moves towards zero. Once the differential voltage has become zero, the switch moves to its central position of rest and stops the motor. In that position, the cam is then correctly placed in relation to the measuring pin and the angular position of the cam is determined.

Figure 6:
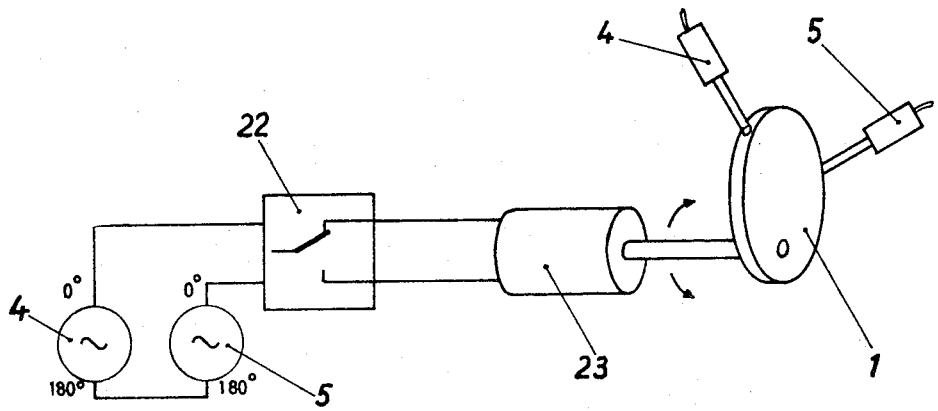
FIG. 6 is a diagram showing in block form a device for automatically determining the angular position of a cam.

FIG. 6 is a diagrammatic representation of an automatic measuring device. Here again, two length measuring followers are provided, represented by the generators 4 and 5, as in the circuit in FIG. 2, but in this instance the differential voltage operates not an indicating instrument 9, but a change-over switch 22, which has a central inoperative position. According to the polarity of the differential voltage, the switch 22 is moved from its inoperative position to one or other of its operative positions, so that a motor, 23, controlled by the switch, is driven forward or in reverse according to the polarity of the differential voltage, with the result that — preferably through reduction gearing, not shown in the drawing — the motor 23 rotates the cam 1 in a direction such that the measurement voltages of the followers 4 and 5 are caused to approach each other and the differential voltage becomes zero. The measuring device shown in FIG. 6 automatically turns the cam that is to be tested into an angular position predetermined by the setting and more particularly the angular position of the followers 4 and 5, without the need for any human work of calculation, evaluation or adjustment.

What is claimed is:

1. A device for measuring the angular position of a cam comprising, in combination;

means for rotatably mounting said cam, first and second electrical cam followers, said first follower arranged to bear radially at a first point on said cam, said second follower arranged to bear radially at a second point on said cam and angularly displaced from said first point, said first and second followers adapted to generate first and second electric signals representative of the radii of said cam at said first and second points, and means for combining said first and second signals to generate a third signal representative of the difference between said first and second signals such that said third signal is indicative of the angular position of said cam.

2. The device as set forth in claim 1 including display means for displaying said third signal indicative of the angular position of said cam.

3. The device as set forth in claim 1 wherein said display means comprises a voltmeter, said first and second signals being combined subtractively to generate said third signal across said voltmeter.

4. The device as set forth in claim 1 including a plurality of first electrical followers for generating a plurality of first electrical signals, said first signals being connected series additively, and a plurality of second electrical followers for generating a plurality of second electrical signals said second signals being connected series additively, said first and second series additively connected signals being connected to a differential circuit.

5. The combination as set forth in claim 4 including means for balancing each one of said signals from each of said followers.

6. The combination as set forth in claim 5 wherein said balancing means comprise a plurality of voltage dividers connected in parallel across the output of each of said followers and a plurality output taps for each of said dividers variable along said dividers.

7. The combination as set forth in claim 4 wherein said first followers and said second followers are displaced in angular symmetry about said cam.

8. The device as set forth in claim 1 including an electric motor connected to rotate said cam and means responsive to said third signal for operating said motor in a direction to reduce said third signal to zero.

9. The combination as set forth in claim 8 wherein said motor operating means comprises a switch responsive to said third signal for energizing said motor for rotation in one direction when said third signal is positive, in the other direction when said third signal is negative and for de-energizing said motor wherein said signal is zero, such that said motor is operated until said cam assumes a predetermined position wherein said third differential signal is zero.

* * * * *